July 28, 1925.
F. A. CHURCH
COASTER COUPLING
Filed Oct. 13, 1924
1,547,856
Fig. 1.
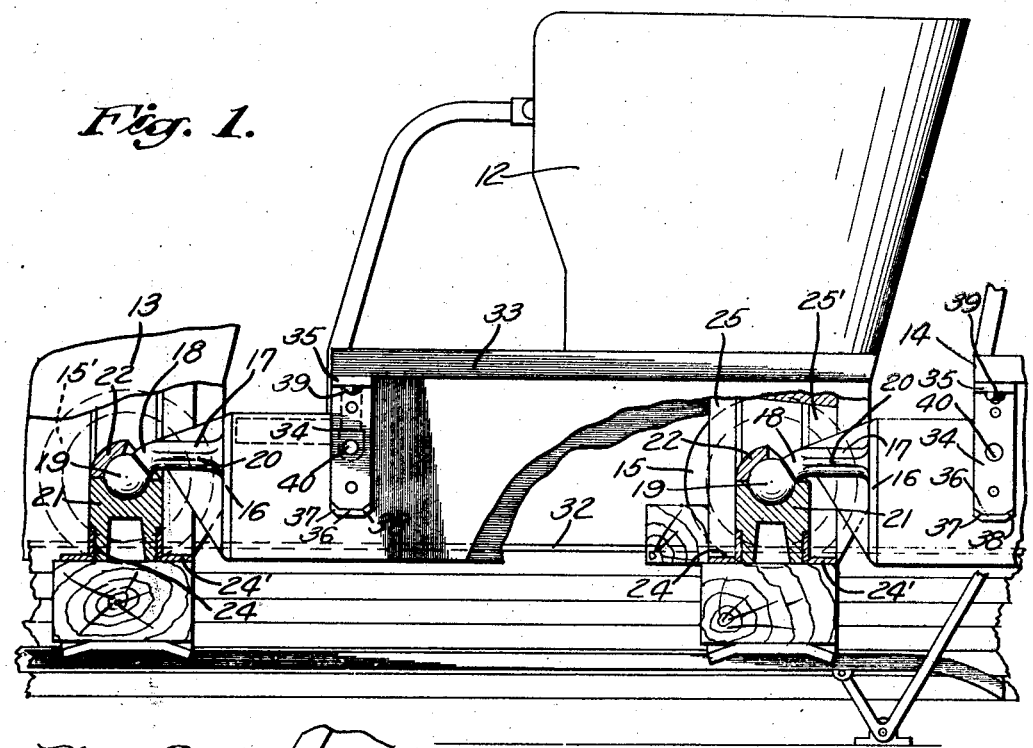
Fig. 2.
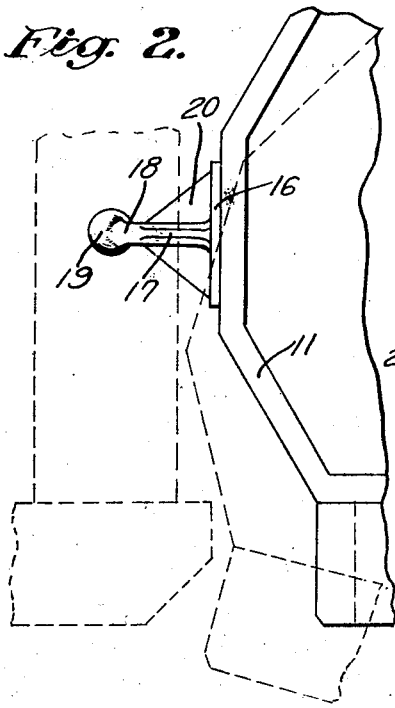
Fig. 3.
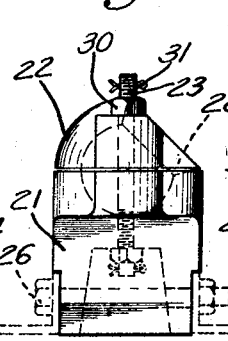
Fig. 4.
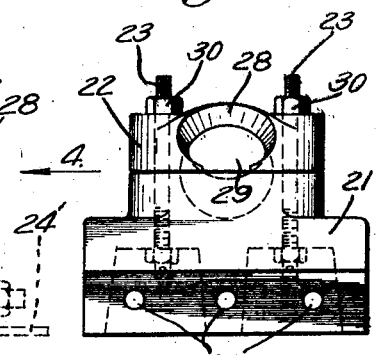
Fig. 5.
INVENTOR
FREDERICK A. CHURCH
ATTORNEY Patented July 28, 1925.

1,547,856

UNITED STATES PATENT OFFICE.

FREDERICK A. CHURCH, OF VENICE, CALIFORNIA.

COASTER COUPLING.

Application filed October 13, 1924. Serial No. 743,273.

*To all whom it may concern:*

Be it known that I, FREDERICK A. CHURCH, a citizen of the United States, residing at Venice, in the county of Los Angeles, State of California, have invented a new and useful Coaster Coupling, of which the following is a specification.

Although my present invention is referred to as a coaster coupling, this invention comprises certain features of coaster construction and support of which a universal joint coupling may be regarded as merely a component part.

It is an object of this invention to provide means for interconnecting a series of coasters, constituting a train, in such manner as to render the resultant organization flexible in all planes, avoiding undue strains upon the frames or bodies of the interconnected cars, while permitting a safe rounding of sharp curves, and the taking of some unusual grades, at high speed.

It is a further object of this invention to provide novel draft or connecting means permitting what may be termed a three-point suspension for each car; and, in a preferred embodiment of my invention, each car may be provided, as near its rear end, with a single pair of ground wheels, the forward end of each car being then supported by means comprising a bearing bracket, which may be placed centrally of the front thereof and may terminate in a ball adapted to engage and interfit with a socket secured, in a corresponding position, between a pair of similar wheels supporting an adjacent car. The mentioned ball-carrying bracket may optionally be rigidly secured to a car frame comprising a substantially U-shaped main frame element; and this main frame element may additionally be provided with means serving not only to reinforce said frame and to attach horizontal side elements thereto, but to provide an emergency support, in the forward end of each car, effective to engage a track, in case of accidental disconnection or derangement of the mentioned normal coupling parts above referred to.

Other objects of my invention will appear from the following description of an illustrative embodiment thereof, taken in connection with the appended claims and the accompanying drawings, in which—

Fig. 1 is a side elevation, with parts broken away, mainly to a substantially central plane, showing a complete outline of one car and parts of two adjacent cars.

Fig. 2 is a top plan view showing a ball-carrying bracket constituting part of a car coupling, an alternative position of the car carrying the same being indicated in dotted lines.

Fig. 3 is a slightly enlarged elevational view of a socket element such as is shown in section in Fig. 1.

Fig. 4 is another elevational view, taken as indicated by the arrow 4, of Fig. 3.

Fig. 5 is a detail sectional view showing a safety device which may optionally be used to provide an emergency support, in case of accidental or other disconnection of the normal coupling organization comprising a ball and socket joint.

Referring to the details of that specific embodiment of my invention chosen for purposes of illustration, 11 may be a substantially U-shaped main frame element of a coaster car 12, this car being preferably similar to adjacent cars 13 and 14 associated therewith in the formation of a train, each car, of the series so formed, being provided with a pair of substantially opposite ground wheels 15, shown as secured at the sides of the parallel extensions of the frame 11, the forward end of this frame being provided with a bearing bracket comprising part of a ball and socket coupling, and the general organization here referred to being such as to provide a three-point suspension for each car.

The ball and socket connection referred to may comprise, for example, a bracket plate 16, rigidly secured to the main frame element 11, and provided with an arm 17 carrying, as by means of an inclined neck 18, a ball 19, adapted to interfit with a socket upon an adjacent car. The arm 17, or its equivalent may be strengthened by means such as substantially triangular webs 20, shown as integral with said arm and with the plate 16; and the bracket so formed may be secured in any suitable way, as by welding, in substantially the central position in which it is illustrated in Figs. 1 and 2.

The co-operating socket element is shown as comprising a base section 21 and a cap section 22, separable therefrom, the opposed and substantially horizontal surfaces of these elements being normally retained in a plane intersecting the ball 19 and in contact by means of bolts 23, extending vertically therethrough, and the height of the section 21, shown as secured to horizontal frame elements 24, 24′ being such that the co-operating hemispherical cavities in said sections may retain the ball 19 substantially in the axis of rotation of the wheels 15 of a leading or forward car.

The horizontal frame elements 24, 24′ or their equivalents, may be secured to the main frame element 11 in any suitable way, as by means comprising substantially vertical angle irons 25, 25′; and the block 21, or its equivalent, may be secured to the horizontal frame elements 24, 24′, between which said block is adapted to fit, by means such as bolts 26, extending through substantially horizontal apertures 27. The cap section or upper socket element 22 may be provided with an outwardly flared opening 28, sufficiently wide to permit a free movement of the neck 18 therein, after the described parts are assembled, a slot or lateral opening being preferably provided, as at 29, to permit the positioning of the cap 22 above the ball 19; and the upper ends of the bolts 23, whether or not these are stud bolts extending upward from the base block 21, may be provided not only with nuts 30, but with additional securing means such as pins 31, extending through suitable transverse openings therein.

Each car being shown as supported by means of two lateral wheels engaging a track 32 and by means of a universal joint coupling of the general character described, I may optionally associate with the described frame elements and coupling means a reinforcing device adapted to serve, upon occasion, as an emergency support, effective to prevent the dropping of the forward end of a car, in case of the breakage or disconnection of a coupling of the general character described.

For example, the frame or body of each car may comprise a plank 33, projecting laterally therefrom in a horizontal plane and supported in such manner as to constitute a step or platform adapted to participate in the support of a car body from the wheels 15, as by means of a U-shaped bracket depending from said plank and providing bearings for an axle, the parts here referred to being omitted from the drawings as immaterial to the present invention; and the plank 33, or its equivalent, may be secured, wholly or in part, by means such as brackets 34, each comprising an upper horizontal leg 35 and a lower horizontal leg 36, ordinarily moving in a horizontal plane above the surface of the track 32 but adapted to contact therewith, and to support a car therefrom, in case of the disconnection or failure of a coupling of the general character above described. One or both of the edges 37 and 38 of the leg 36 of the bracket 34 may be upwardly inclined in such manner as to adapt this leg to slide freely upon a track 32; and the brackets 34, or their equivalent, may be secured to the main frame element 11 and to the plank 33, or to the equivalents of these elements, in any suitable way, as by means of bolts 39 and 40.

Although I have herein described a single complete embodiment of my invention, it will be understood that various features thereof might be independently employed, and also that various modifications might be made, by those skilled in the art to which this case relates, without the slightest departure from the spirit and scope of my invention, as the same is indicated above and in the following claims.

I claim as my invention:

1. In a coaster train, a plurality of cars in said train comprising frames arranged one following another, a three-point supporting means for each car frame, said supporting means in each case comprising a single pair of wheels and a universal joint coupling, which serves as a draft connection between said cars and comprising a ball positioned entirely in advance of a bracket plate secured at the extreme front of each following frame.

2. An organization as defined in claim 1 in which said universal joint comprises a ball connected with a substantially vertical bracket plate by means comprising a downwardly extending neck.

3. A draft device, for connecting one two-wheeled car with another two-wheeled car, which comprises: a ball rigidly secured by a downwardly extending neck and a substantially horizontal arm to a substantially vertical bracket plate supported from one of said cars; and a co-operating socket for the retention of said ball secured substantially in the axis of a pair of wheels directly supporting the other of said cars.

4. A draft device as defined in claim 3 in which said neck extends between a terminal ball and a horizontal arm reinforced by substantially triangular webs extending to said substantially vertical bracket plate.

5. An organization as defined in claim 3 in which said socket is formed in two parts meeting in a substantially horizontal plane intersecting said ball, one of said parts being in the form of a cap provided with a lateral slot.

6. An organization as defined in claim 3 in which said socket is formed in two parts meeting in a horizontal plane and secured together by means comprising substantially vertical bolts provided with threaded nuts and also with pins for the secure retention of said nuts, one of said parts being in the form of a cap provided with a lateral opening for said neck.

7. An organization as defined in claim 3 in which said socket member comprises a removable cap section provided with a lateral slot of sufficient width to receive the mentioned neck.

8. An organization as defined in claim 3 in which said socket member comprises a removable cap section provided with a lateral slot of sufficient width to receive the mentioned neck, said cap section co-operating with a base section through which extend substantially vertical clamping bolts, and through which extend substantially horizontal means for the attachment of said socket member to a car frame.

9. An organization as defined in claim 1 in which each car is provided with a forwardly extending main frame element, substantially U-shaped in horizontal outline, from whose front extends a ball-carrying bracket and from whose sides extend emergency supports, said supports being normally disposed above and out of contact with the rails on which said wheels travel.

10. An organization as defined in claim 1 in which each car is provided with a forwardly extending main frame element substantially U-shaped in horizontal outline, from the front of which extends one element of a ball and socket draft connection, and from the sides of which extend emergency supports effective to prevent the dropping of the front end of said car in case of its disconnection, each of said emergency supports comprising a U-shaped bracket adapted to support a platform element rigidly connected with said frame.

11. An organization as defined in claim 1 in which each car is provided with a forwardly extending main frame element substantially U-shaped in horizontal outline, from the front of which extends one element of a ball and socket draft connection, and from the sides of which extend emergency supports effective to prevent the dropping of the front end of said car in case of its disconnection, said emergency supports being integral with means for the reinforcement of said car.

In testimony whereof, I have hereunto set my hand at Los Angeles, California, this 6th day of October, 1924.

FREDERICK A. CHURCH.